(12) United States Patent
Wang et al.

(10) Patent No.: US 12,470,268 B2
(45) Date of Patent: Nov. 11, 2025

(54) CHANNEL STATE INFORMATION FEEDBACK FOR MULTIPLE ANTENNAS

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Yu Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 431 days.

(21) Appl. No.: 17/998,743

(22) PCT Filed: Jul. 21, 2020

(86) PCT No.: PCT/CN2020/103222
§ 371 (c)(1),
(2) Date: Nov. 14, 2022

(87) PCT Pub. No.: WO2022/016361
PCT Pub. Date: Jan. 27, 2022

(65) Prior Publication Data
US 2023/0344487 A1    Oct. 26, 2023

(51) Int. Cl.
*H04B 7/06* (2006.01)
*H04B 7/0456* (2017.01)

(52) U.S. Cl.
CPC ......... *H04B 7/0478* (2013.01); *H04B 7/0626* (2013.01); *H04B 7/0639* (2013.01); *H04B 7/06952* (2023.05)

(58) Field of Classification Search
CPC .. H04B 7/0478; H04B 7/0486; H04B 7/0469; H04B 7/0617; H04B 7/0626; H04B 7/0639; H04B 7/065; H04B 7/0695; H04B 7/0874; H04B 7/088; H04B 7/0891; H04L 1/0687; H04L 1/0693; Y02D 30/70

See application file for complete search history.

(56) References Cited

U.S. PATENT DOCUMENTS 9,794,817 B2 * 10/2017 Ko .................. H04B 7/0479
10,033,507 B2 * 7/2018 Yum ................ H04B 7/0479
(Continued)

FOREIGN PATENT DOCUMENTS

| CN | 104272611 A | 1/2015 |
| CN | 104412520 A | 3/2015 |
| WO | WO-2016079694 A1 | 5/2016 |

OTHER PUBLICATIONS

International Search Report and Written Opinion—PCT/CN2020/103222—ISA/EPO—Apr. 26, 2021.
(Continued)

*Primary Examiner* — Frank Duong
(74) *Attorney, Agent, or Firm* — Harrity & Harrity, LLP

(57) ABSTRACT

Various aspects of the present disclosure generally relate to wireless communication. In some aspects, a user equipment (UE) may determine a first channel state information (CSI) for a first group of antennas of the UE and a second CSI for a second group of antennas of the UE, where the first group of antennas are different than the second group of antennas. The UE may transmit one or more of the first CSI or the second CSI in a CSI report. Numerous other aspects are provided.

29 Claims, 11 Drawing Sheets

(56) References Cited

U.S. PATENT DOCUMENTS

| | | | |
|---|---|---|---|
| 10,425,921 B2* | 9/2019 | Lee | H04L 1/0028 |
| 10,536,205 B2* | 1/2020 | Rahman | H04B 7/0617 |
| 2015/0146618 A1* | 5/2015 | Ko | H04L 5/0053 |
| | | | 370/328 |

OTHER PUBLICATIONS

ZTE: "Details of CSI Framework", 3GPP TSG RAN WG1 Meeting #88, R1-1701806, Athens, Greece, Feb. 13, 2017-Feb 17, 2017, 9 Pages, Feb. 17, 2017 (Feb. 17, 2017), part 2.

* cited by examiner

900 →

| |
|---|
| Priority 0:<br><br>For CSI reports 1 to $N_{Rep}$, Group 0 CSI for CSI reports configured as 'typeII-r16' or 'typeII-PortSelection-r16'; Part 1 and 2 wideband CSI (except PMI2) for CSI reports configured otherwise |
| Priority 1:<br><br>For CSI reports 1 to $N_{Rep}$, Group 0 CSI for CSI reports configured as 'typeII-r16' or 'typeII-PortSelection-r16'; Part 1 and 2 wideband CSI PMI2 for CSI reports configured otherwise |
| Priority 2:<br><br>Group 1 CSI for CSI report 1, if configured as 'typeII-r16' or 'typeII-PortSelection-r16'; Part 2 subband CSI of even subbands (except PMI2) for CSI report 1, if configured otherwise |
| Priority 3:<br><br>Group 1 CSI for CSI report 1, if configured as 'typeII-r16' or 'typeII-PortSelection-r16'; Part 2 subband CSI of even subbands PMI2 for CSI report 1, if configured otherwise |
| Priority 4:<br><br>Group 2 CSI for CSI report 1, if configured as 'typeII-r16' or 'typeII-PortSelection-r16'; Part 2 subband CSI of odd subbands (except PMI2) for CSI report 1, if configured otherwise |
| Priority 5:<br><br>Group 2 CSI for CSI report 1, if configured as 'typeII-r16' or 'typeII-PortSelection-r16'; Part 2 subband CSI of odd subbands PMI2 for CSI report 1, if configured otherwise |
| ⋮ |
| Priority $4N_{Rep}$:<br><br>Group 1 CSI for CSI report $N_{Rep}$, if configured as 'typeII-r16' or 'typeII-PortSelection-r16'; Part 2 subband CSI of even subbands (except PMI2) for CSI report $N_{Rep}$, if configured otherwise |
| Priority $4N_{Rep}+1$:<br><br>Group 2 CSI for CSI report $N_{Rep}$, if configured as 'typeII-r16' or 'typeII-PortSelection-r16'; Part 2 subband CSI of odd subbands PMI2 for CSI report $N_{Rep}$, if configured otherwise |

FIG. 9

CHANNEL STATE INFORMATION FEEDBACK FOR MULTIPLE ANTENNAS

CROSS-REFERENCE TO RELATED APPLICATION

This Patent Application is a 371 national stage of PCT Application No. PCT/CN2020/103222 filed on Jul. 21, 2020, entitled "CHANNEL STATE INFORMATION FEEDBACK FOR MULTIPLE ANTENNAS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for channel state information feedback for a user equipment with multiple antennas.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a first channel state information (CSI) for a first group of antennas of the UE and a second CSI for a second group of antennas of the UE. The first group of antennas may be different than the second group of antennas. The method includes transmitting one or more of the first CSI or the second CSI in a CSI report.

In some aspects, a method of wireless communication performed by a base station includes receiving a first CSI for a first group of antennas of a UE and a second CSI for a second group of antennas of the UE. The first group of antennas may be different than the second group of antennas. The method includes determining a first precoder for the first group of antennas and a second precoder for the second group of antennas, and transmitting the first precoder and the second precoder to the UE.

In some aspects, a UE for wireless communication includes a memory and one or more processors operatively coupled to the memory, the memory and the one or more processors configured to determine a first CSI for a first group of antennas of the UE and a second CSI for a second group of antennas of the UE, where the first group of antennas are different than the second group of antennas, and transmit one or more of the first CSI or the second CSI in a CSI report.

In some aspects, a base station for wireless communication includes a memory and one or more processors operatively coupled to the memory, the memory and the one or more processors configured to receive a first CSI for a first group of antennas of a UE a second CSI for a second group of antennas of the UE, where the first group of antennas are different than the second group of antennas, determine a first precoder for the first group of antennas and a second precoder for the second group of antennas, and transmit the first precoder and the second precoder to the UE.

In some aspects, a non-transitory computer-readable medium storing a set of instructions for wireless communication includes one or more instructions that, when executed by one or more processors of a UE, cause the UE to determine a first CSI for a first group of antennas of the UE and a second CSI for a second group of antennas of the UE, where the first group of antennas are different than the second group of antennas, and transmit one or more of the first CSI or the second CSI in a CSI report.

In some aspects, a non-transitory computer-readable medium storing a set of instructions for wireless communication includes one or more instructions that, when executed by one or more processors of a base station, cause the base station to receive a first CSI for a first group of antennas of a UE and a second CSI for a second group of antennas of the UE, where the first group of antennas are different than the second group of antennas, determine a first precoder for the first group of antennas and a second precoder for the second group of antennas, and transmit the first precoder and the second precoder to the UE.

In some aspects, an apparatus for wireless communication includes means for determining a first CSI for a first group of antennas of the apparatus and a second CSI for a second group of antennas of the apparatus, where the first group of antennas are different than the second group of antennas, and means for transmitting one or more of the first CSI or the second CSI in a CSI report.

In some aspects, an apparatus for wireless communication includes means for receiving a first CSI for a first group of antennas of a UE and a second CSI for a second group of antennas of the UE, where the first group of antennas are different than the second group of antennas, means for determining a first precoder for the first group of antennas and a second precoder for the second group of antennas, and means for transmitting the first precoder and the second precoder to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example of priorities for CSI feedback, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
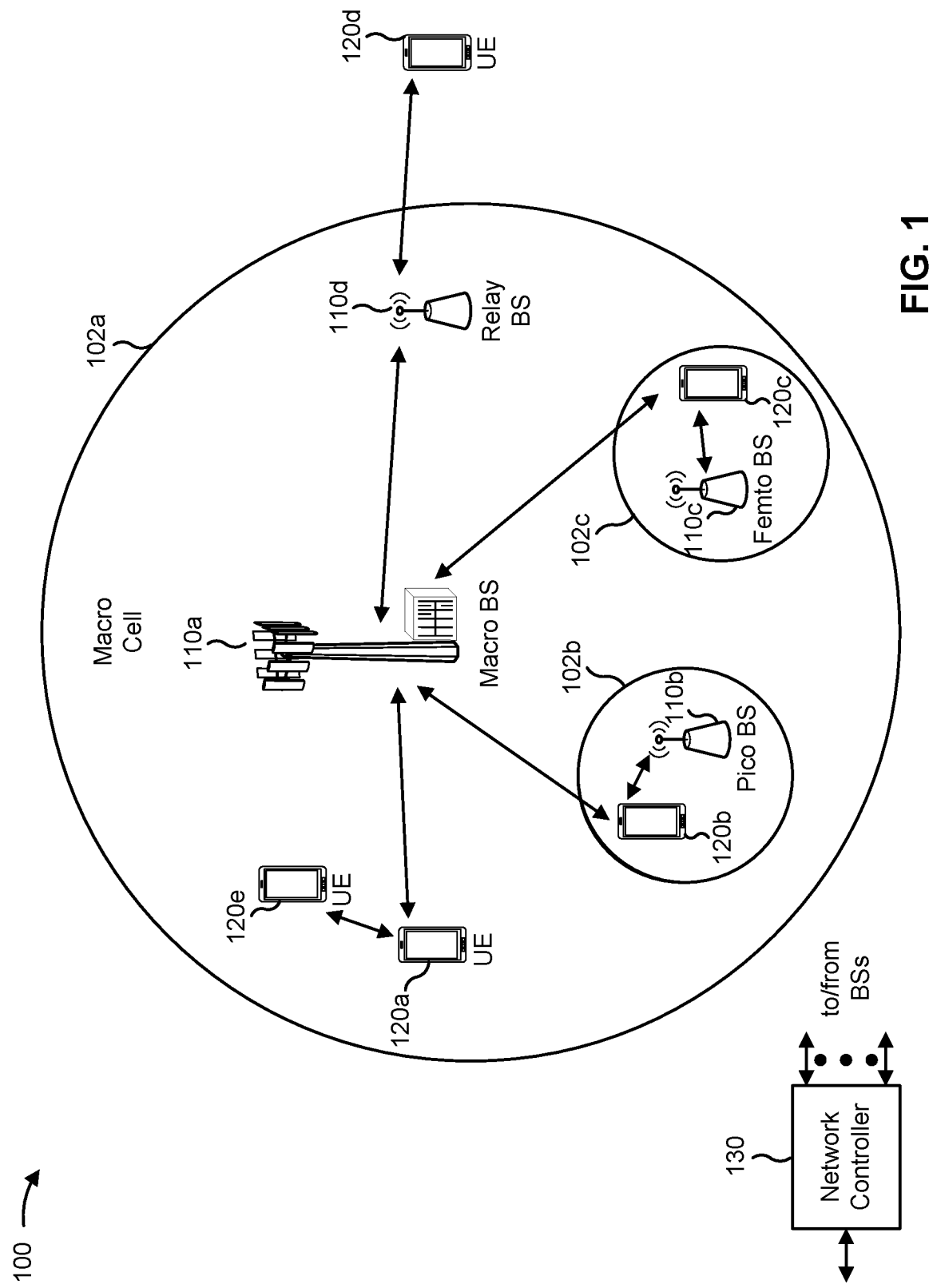
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
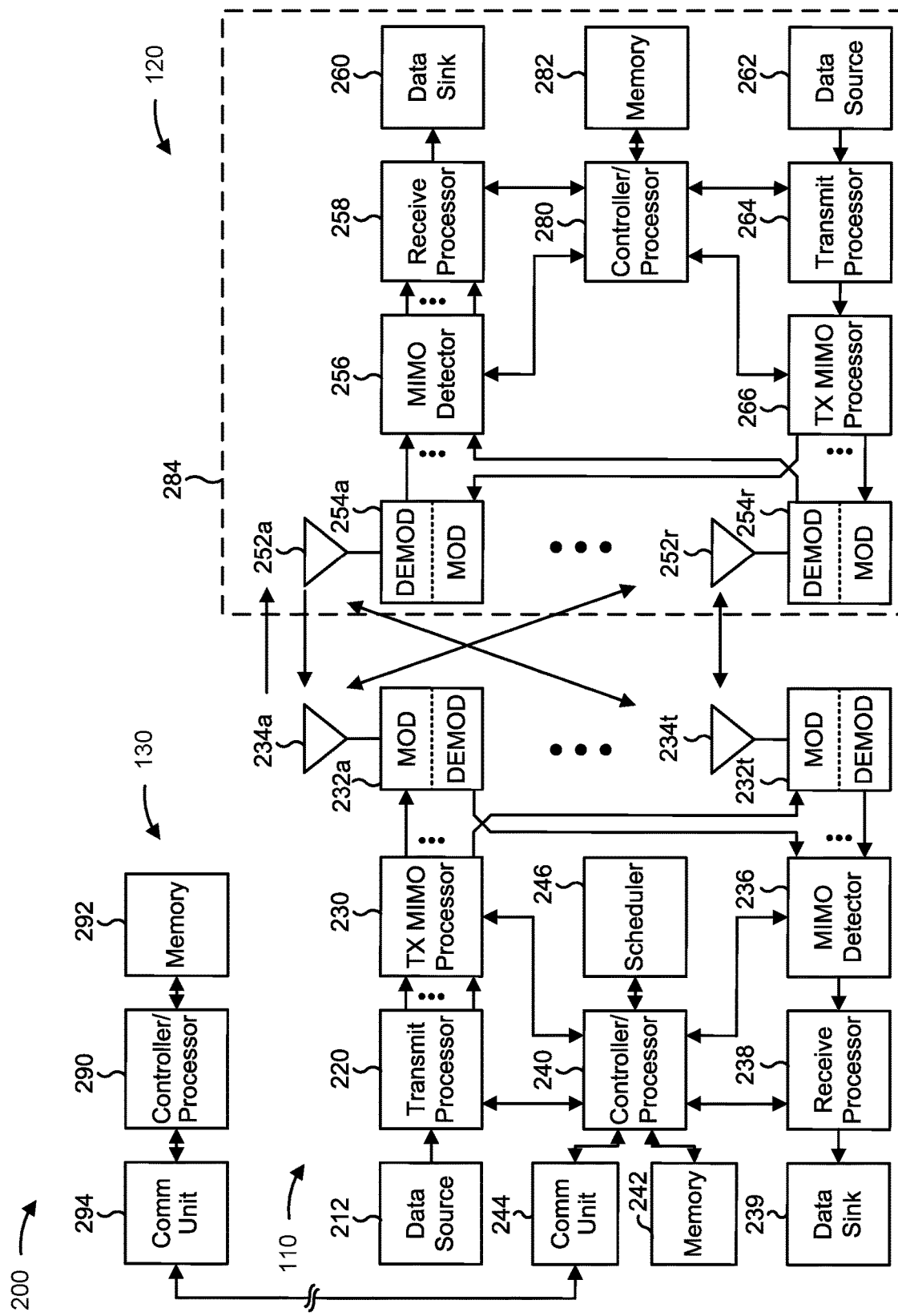
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-11.

Controller/processor 240 of base station 110, controller/processor 280 of UE 120, and/or any other component(s) of FIG. 2 may perform one or more techniques associated with channel state information (CSI) feedback for a UE with multiple antennas as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, interpreting the instructions, and/or the like.

In some aspects, UE 120 may include means for determining a first CSI for a first group of antennas of the UE and a second CSI for a second group of antennas of the UE, where the first group of antennas are different than the second group of antennas, means for transmitting one or more of the first CSI or the second CSI in a CSI report, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving a first CSI for a first group of antennas of a UE and a second CSI for a second group of antennas of the UE, where the first group of antennas are different than the second group of antennas, mean for determining a first precoder for the first group of antennas and a second precoder for the second group of antennas, means for transmitting the first precoder and the second precoder to the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
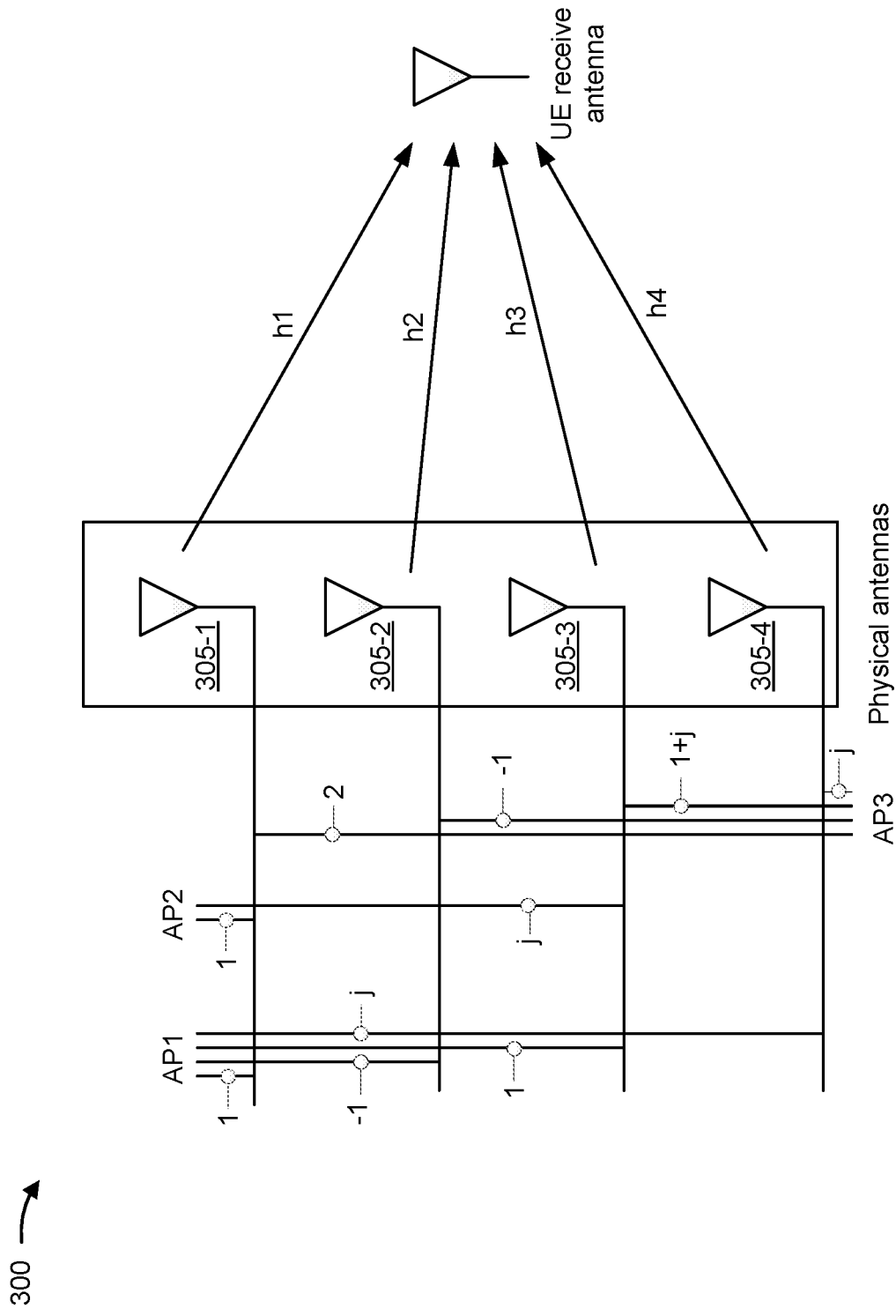
FIG. 3 is a diagram illustrating an example of antenna ports, in accordance with various aspects of the present disclosure.

FIG. 3 is a diagram illustrating an example 300 of antenna ports, in accordance with various aspects of the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and "precoder" may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 3 is provided merely as an example. Other examples may differ from what is described with regard to FIG. 3.

Figure 4:
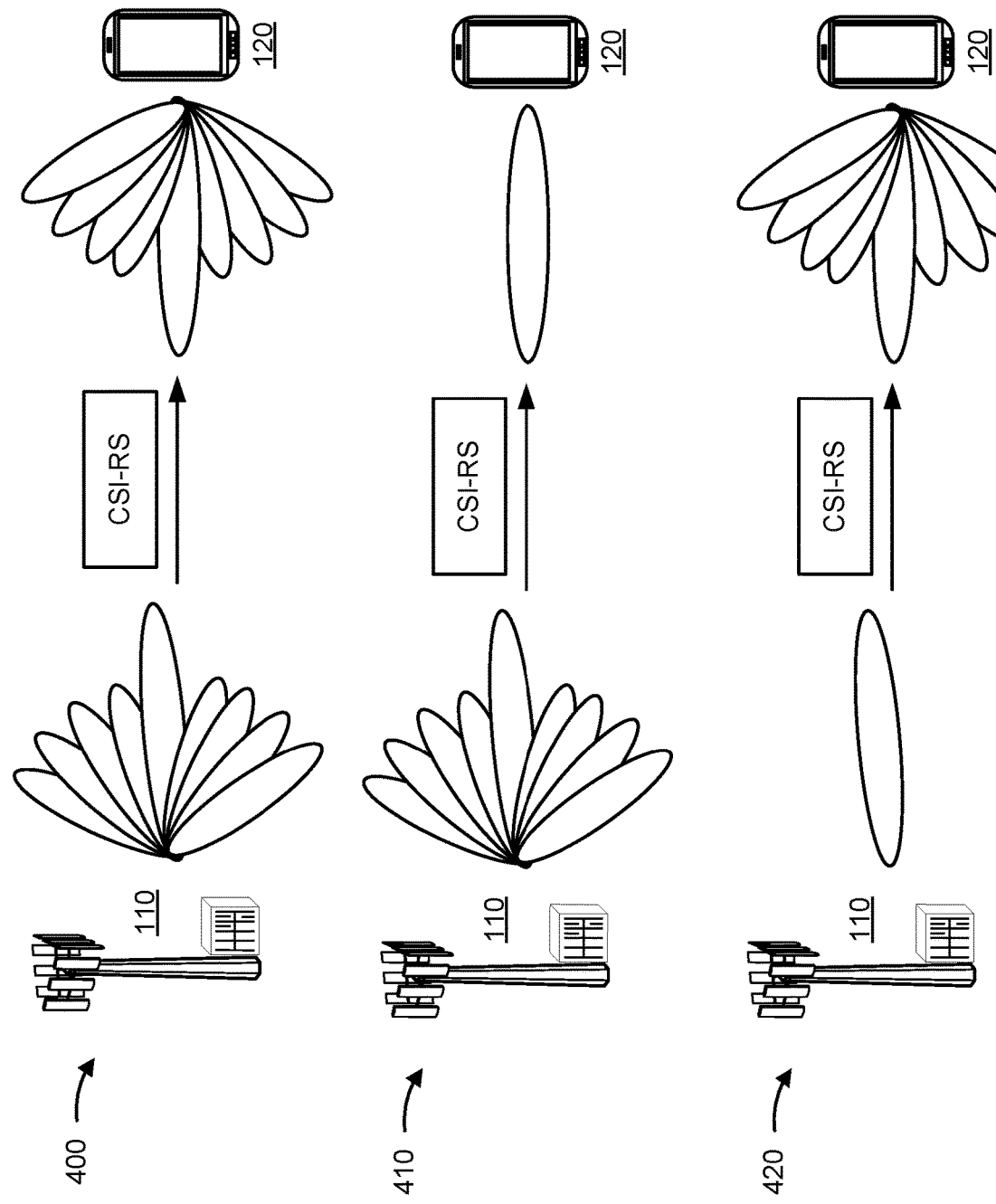
FIG. 4 is a diagram illustrating examples of CSI reference signal (CSI-RS) beam management procedures, in accordance with various aspects of the present disclosure.

FIG. 4 is a diagram illustrating examples 400, 410, and 420 of CSI reference signal (CSI-RS) beam management procedures, in accordance with various aspects of the present disclosure. As shown in FIG. 4, examples 400, 410, and 420 include a UE 120 in communication with a base station 110 in a wireless network (e.g., wireless network 100). However, the devices shown in FIG. 4 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, a UE 120 and a base station 110 may be in a connected state (e.g., an RRC connected state and/or the like).

As shown in FIG. 4, example 400 may include a base station 110 and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 4 and example 400, CSI-RSs may be configured to be transmitted from base station 110 to UE 120. The CSI-RSs may be configured to be periodic (e.g., using radio resource control (RRC) signaling and/or the like), semi-persistent (e.g., using media access control (MAC) control element (MAC-CE) signaling and/or the like), and/or aperiodic (e.g., using downlink control information (DCI) and/or the like).

The first beam management procedure may include base station 110 performing beam sweeping over multiple transmit (Tx) beams. Base station 110 may transmit a CSI-RS using each transmit beam for beam management. To enable UE 120 to perform receive (Rx) beam sweeping, each CSI-RS on a transmit beam can be transmitted repeatedly multiple times in the same RS resource set so that UE 120 can sweep through receive beams in multiple transmission instants. For example, if base station 110 has a set of N transmit beams and UE 120 has a set of M receive beams, the CSI-RS may be transmitted on each of the N transmit beams M times so that UE 120 may receive M beams per transmit beam. In other words, for each transmit beam of base station 110, UE 120 may perform beam sweeping through the receive beams of UE 120. As a result, the first beam management procedure may enable UE 120 to measure a CSI-RS on different transmit beams using different receive beams to support selection of base station 110 transmit beams/UE 120 receive beam(s) beam pair(s). UE 120 may report the measurements to base station 110 to enable base station 110 to select one or more beam pair(s) for communication between base station 110 and UE 120. UE 120 may provide the measurements as a result of the measurements in a CSI report. While example 400 has been described in connection with CSI-RSs, the first beam management process may also use synchronization signal blocks for beam management in a similar manner as described above.

As shown in FIG. 4, example 410 may include base station 110 and UE 120 communicating to perform beam management using CSI-RSs. Example 410 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 4 and example 410, CSI-RSs may be configured to be transmitted from base station 110 to UE 120. The CSI-RSs may be configured to be aperiodic (e.g., using DCI and/or the like). The second beam management procedure may include base station 110 performing beam sweeping over one or more transmit beams. The one or more transmit beams may be a subset of all transmit beams associated with base station 110 (e.g., determined based at least in part on measurements reported by UE 120 in connection with the first beam management procedure). Base station 110 may transmit a CSI-RS using each transmit beam of the one or more transmit beams for beam management. UE 120 may measure each CSI-RS using a single (e.g., a same) receive beam (e.g., determined based at least in part on measurements performed in connection with the first beam management procedure). The second beam management procedure may enable base station 110 to select a best transmit beam based at least in part on reported measurements received from UE 120 (e.g., using the single receive beam).

As shown in FIG. 4, example 420 may depict a third beam management procedure (e.g., P3 CSI-RS beam management). The third beam management procedure may be referred to as a beam refinement procedure, a UE beam refinement procedure, a receive beam refinement procedure, and/or the like. As shown in FIG. 4 and example 420, one or more CSI-RSs may be configured to be transmitted from base station 110 to UE 120. The CSI-RSs may be configured to be aperiodic (e.g., using DCI and/or the like). The third beam management process may include base station 110 transmitting the one or more CSI-RSs on a single transmit beam (e.g., determined based at least in part on measurements reported by UE 120 in connection with the first beam management procedure and/or the second beam management procedure). To enable UE 120 to perform receive beam sweeping, the CSI-RS on the transmit beam can be transmitted repeatedly multiple times in the same RS resource set so that UE 120 can sweep through one or more receive beams in multiple transmission instants. The one or more receive beams may be a subset of all receive beams associated with UE 120 (e.g., determined based at least in part on measurements performed in connection with the first beam management procedure and/or the second beam management procedure). The third beam management procedure may enable base station 110 and/or UE 120 to select a best receive beam based at least in part on reported measurements received from UE 120 (e.g., of the CSI-RS on the transmit beam using the one or more receive beams).

As indicated above, FIG. 4 is provided as an example. Other examples may differ from what is described with respect to FIG. 4.

Figure 5:
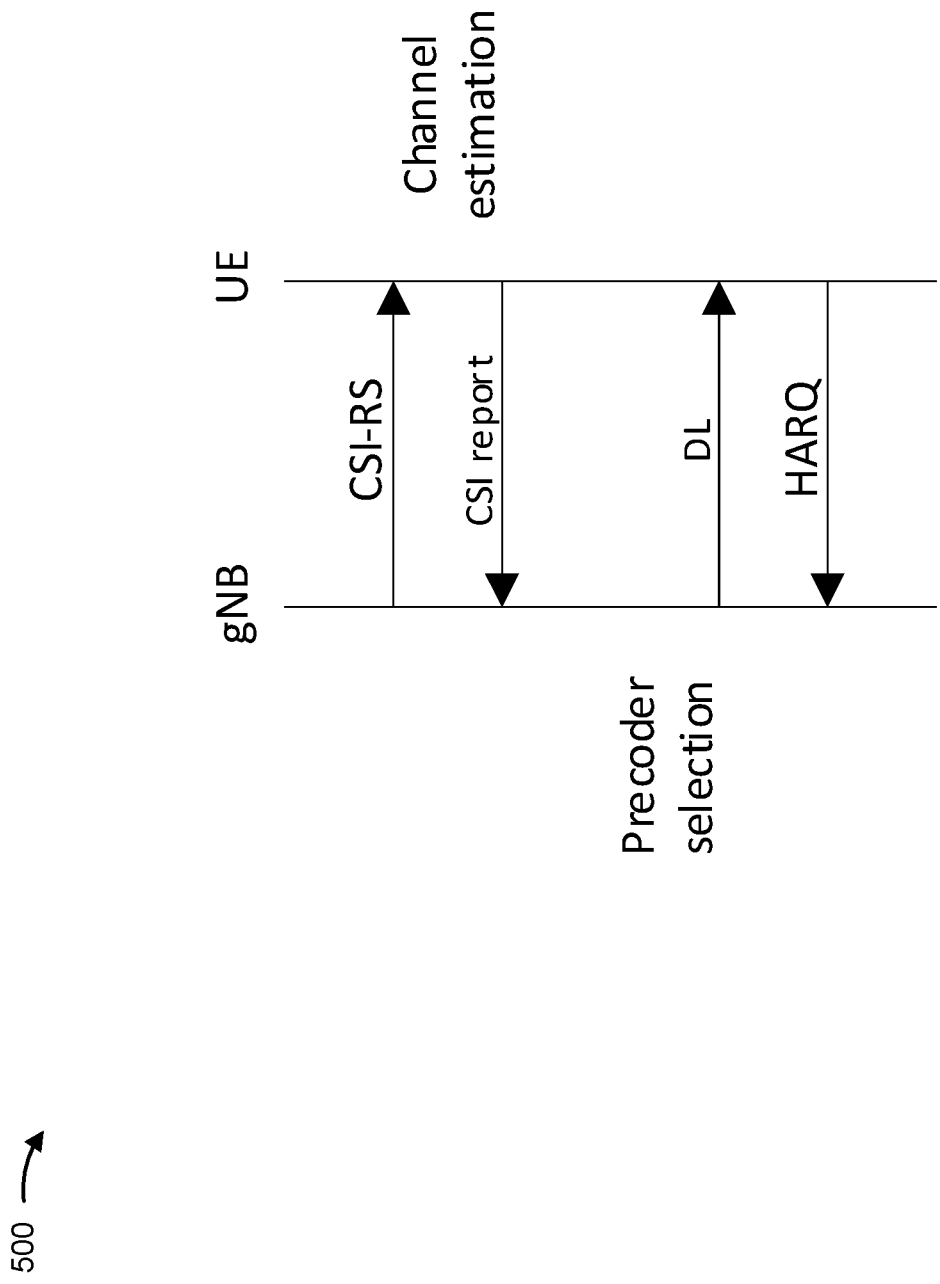
FIG. 5 is a diagram illustrating an example of precoder selection, in accordance with various aspects of the present disclosure.

FIG. 5 is a diagram illustrating an example 500 of precoder selection, in accordance with various aspects of the present disclosure.

FIG. 5 shows a base station (e.g., gNB) that may transmit a CSI-RS to a UE. The UE may perform channel estimation and measure a strength and/or quality of the CSI-RS. The UE may provide an indication of measurement results (CSI feedback) in a CSI report. A CSI report may include, in a first part of the CSI report, a number of fields, including a CSI-RS resource indicator (CRI), a rank indicator, a layer indicator, padding bits (if needed), precoder matrix indicator (PMI) wideband information fields, a wideband channel quality indicator (CQI), and/or the like. The CSI report may include, in a second part of the CSI report, PMI subband information fields, a subband differential CQI, and/or the like.

The gNB may use the CSI feedback to select a precoder for the UE. The gNB may provide the precoder to the UE, and the UE may provide a hybrid automatic repeat request (HARD) message in return.

As indicated above, FIG. 5 is provided as an example. Other examples may differ from what is described with respect to FIG. 5.

Figure 6:
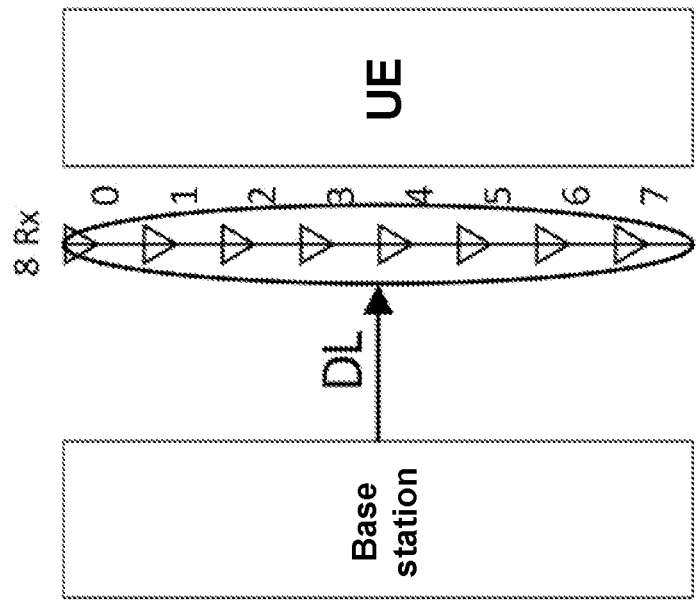
FIG. 6 is a diagram illustrating an example of a UE with multiple antennas, in accordance with various aspects of the present disclosure.

FIG. 6 is a diagram illustrating an example 600 of a UE with multiple antennas, in accordance with various aspects of the present disclosure.

High-tier UEs, such as a customer premises equipment box or a laptop, may have space for more antennas (e.g., 6-8 antennas). The UE shown in FIG. 6 has, for example, 8 antennas. More antennas may lead to better performance. However, having more antennas leads to higher complexity. There is a tradeoff between antenna performance and antenna complexity.

The tradeoff between performance and complexity may cause the UE to provide less accurate CSI because the UE may provide a CSI report for the whole UE, or for all of the antennas. Some antennas may warrant a different precoder than other antennas, but such granularity is lost in the single CSI generated for the whole UE. If the CSI provided to a base station is less accurate, precoder selection by the base station may be less accurate. As a result, the UE and the base station may suffer degraded communications.

As indicated above, FIG. 6 is provided as an example. Other examples may differ from what is described with respect to FIG. 6.

Figure 7:
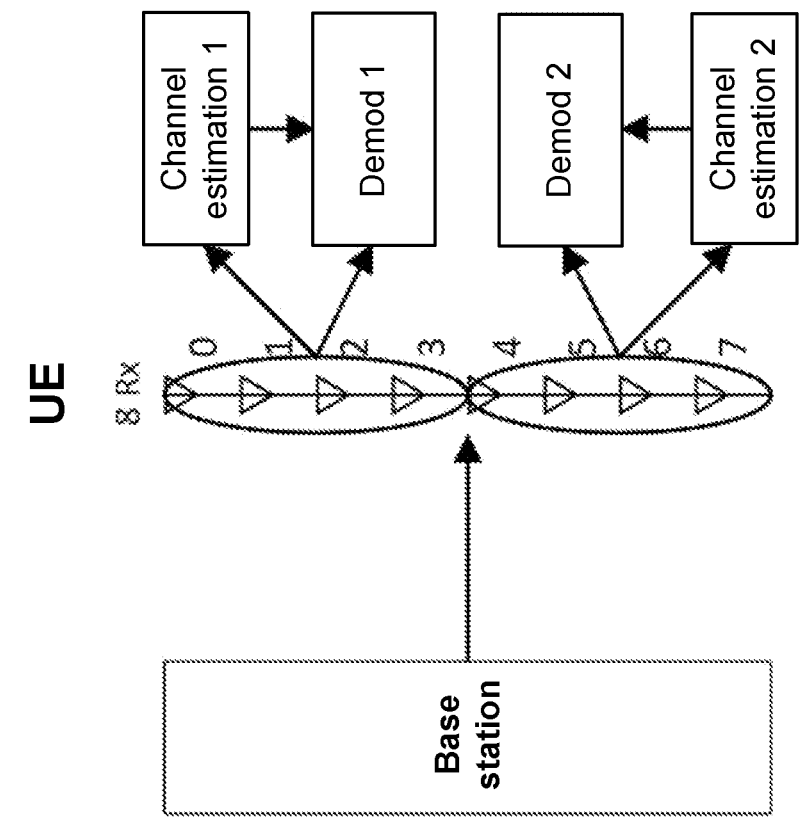
FIG. 7 is a diagram illustrating an example of CSI feedback for a UE with multiple antennas, in accordance with various aspects of the present disclosure.

FIG. 7 is a diagram illustrating an example 700 of CSI feedback for a UE with multiple antennas, in accordance with various aspects of the present disclosure.

According to various aspects described herein, a UE may separate the antennas of the UE into groups of antennas and provide separate CSI for each group of antennas. For example, as shown in FIG. 7, the UE may separate 8 antennas into a first group of 4 antennas and a second group of 4 antennas. The UE may perform channel estimation and demodulation of a CSI-RS for the first group and perform channel estimation and demodulation of the CSI-RS for the second group. The UE may indicate measurement results in CSI for the first group and measurements results in CSI for the second group. A base station that receives the CSI for the first group and the CSI for the second group may select and provide one or more precoders for the UE based at least in part on the CSI for each group. Precoder selection for such aspects may be more granular and thus more accurate. As a result, the UE and the base station improve communications between the UE and the base station.

As indicated above, FIG. 7 is provided as an example. Other examples may differ from what is described with respect to FIG. 7.

Figure 8:
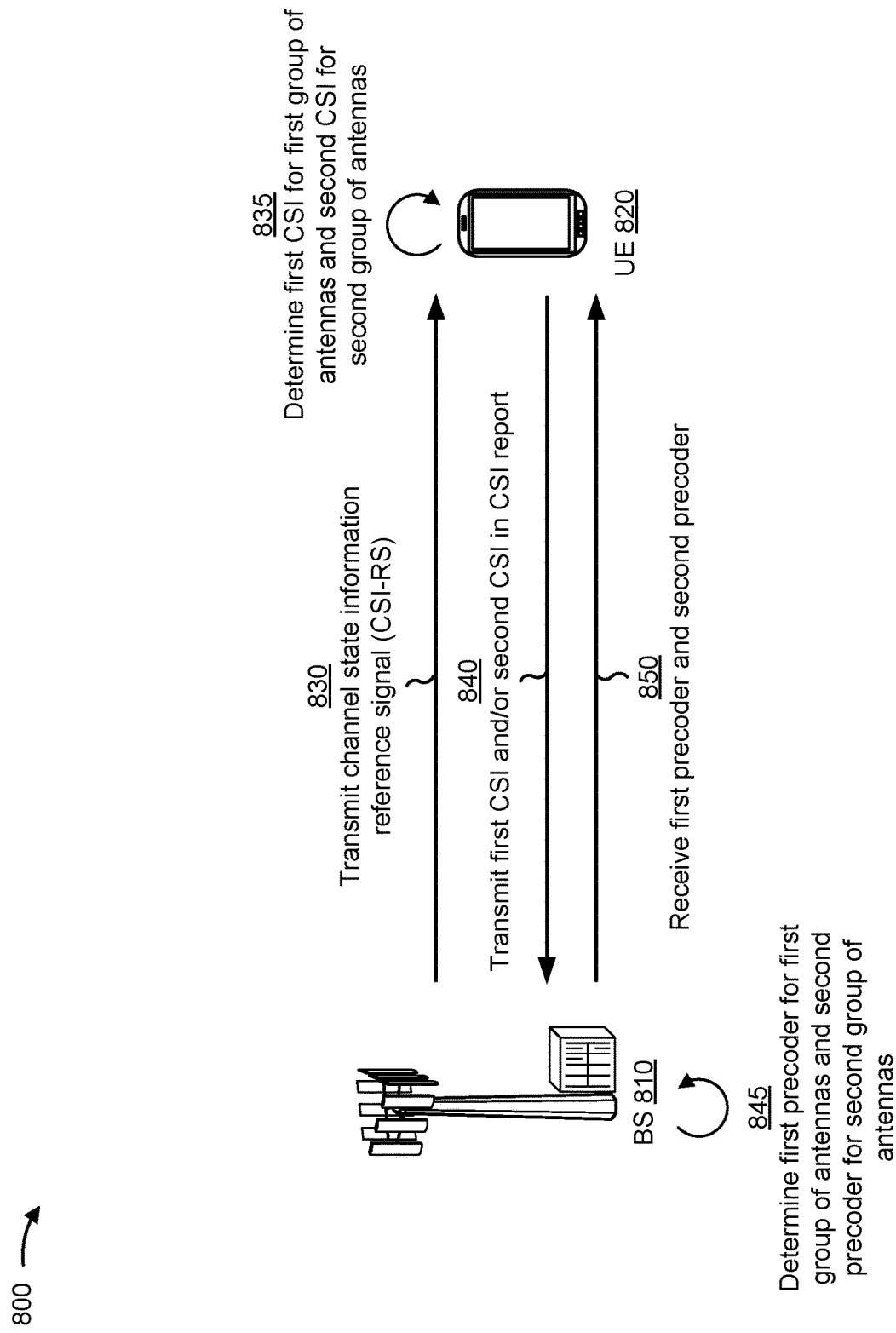
FIG. 8 is a diagram illustrating an example of CSI feedback for a UE with multiple antennas, in accordance with various aspects of the present disclosure.

FIG. 8 is a diagram illustrating an example 800 of CSI feedback for a UE with multiple antennas, in accordance with various aspects of the present disclosure. As shown in FIG. 8, example 800 includes communication between a base station (BS) 810 (e.g., BS 110 depicted in FIGS. 1 and 2, the base station depicted in FIG. 6, and/or the like) and a UE 820 (e.g., a UE 110 depicted in FIGS. 1 and 2, the UE depicted in FIG. 6, and/or the like). UE 820 may include multiple antennas (e.g., 6-8 antennas). In some aspects, BS 810 and UE 820 may be included in a wireless network, such as wireless network 100. BS 810 and UE 820 may communicate on a wireless access link, which may include an uplink and a downlink.

UE 820 may have separated multiple antennas of UE 820 into two or more groups of antennas for CSI reporting. For example, if UE 820 has 8 antennas, the first group of antennas may include antennas 0-3 and the second group of antennas may include antennas 4-7. UE 820 may use other groupings, overlapping groupings, other combinations of antennas, and/or the like.

As shown by reference number 830, BS 810 may transmit a CSI-RS to UE 820. As shown by reference number 835, UE 820 may determine, from the CSI-RS, a first CSI for the first group of antennas and a second CSI for the second group of antennas. For example, UE 820 may perform channel estimation and demodulation for the first group of antennas and separately for the second group of antennas. UE 820 may include measurement results for the first group of antennas in the first CSI and measurement results for the second CSI. UE 820 may transmit the first CSI and the second CSI in a CSI report, as shown by reference number 840. This may be referred to as a multi-CSI report.

In some aspects, UE 820 may determine CSI for separate groups of antennas based at least in part on a configuration received from BS 810. For example, UE 820 may report a UE capability for demodulation that indicates low complexity demodulation, and BS 810 may configure UE 820 to provide a multi-CSI report based at least in part on the UE capability indicating low complexity demodulation. Low complexity may be based at least in part on a determination that a complexity of demodulation for antennas is below a complexity threshold.

In some aspects, BS 810 may configure UE 820 using RRC parameters, such a as a report quantity parameter that indicates how many CSI are to be reported in a CSI report and/or how antennas of UE 820 are to be grouped. In some aspects, BS 810 may configure UE 820 for a common CSI report, where UE 820 is to report CSI according to a demodulation that is at a maximum support capability. For example, BS 810 may configure UE 820 to report an overall CSI report for all of the antennas of UE 820 or report CSI for just one group of antennas. Additionally, or alternatively, BS 810 may configure UE 820 for a multi-CSI report, where UE 820 is to report CSI for each of multiple groups of antennas.

In some aspects, UE 820 may determine the first CSI by determining a first PMI for the first group of antennas and determine the second CSI by determining a second PMI for the second group of antennas. UE 820 may provide the first PMI and the second PMI in the CSI report.

As shown by reference number 845, BS 810 may determine a first precoder for UE 820 based at least in part on the first CSI and a second precoder based at least in part on the second CSI. As a result, the precoder selection may be more accurate than if precoder selection was not based on multiple UE demodulation algorithms and multi-CSI feedback. As shown by reference number 850, BS 810 may transmit the first precoder and the second precoder to UE 820. UE 820 may use the first precoder for communication using the first group of antennas and use the second precoder for communication using the second group of antennas. As a result, communications may be improved for BS 810 and UE 820 by using separate precoders for separate groups of antennas rather than using a single precoder for all of the antennas.

In some aspects, the CSI report transmitted by UE 820 may include PMI wideband information fields for the first CSI and PMI wideband information fields for the second CSI. For example, an order of fields in the CSI report may include PMI1 wideband information fields X1, PMI1 wideband information fields X2, PMI2 wideband information fields X1, and PMI2 wideband information fields X2. In some aspects, PMI1 may be in a first part of a CSI report, such as in a common CSI report, and PMI2 may be in a second part. In some aspects, the second part may include information for PMI2 and not for PMI1.

The CSI report may include PMI subband information fields for the first CSI and PMI subband information fields for the second CSI. In some aspects, an order of information fields in the CSI report may include PMI1 wideband (X1, X2), PMI2 wideband (X1,X2), PMI1 subband (X2 even), PMI2 subband (X2 even), PMI1 subband (X2 odd), and PMI2 subband (X2 odd). While examples of information fields in a CSI report are provided herein, a CSI report may include other orders or combinations of information fields.

In some aspects, UE 820 may calculate a CQI based at least in part on the first CSI and the second CSI rather than using a single common precoder. For example, CQI may be calculated by:

$$\begin{pmatrix} y^{(3000)}(i) \\ \ldots \\ y^{(3000+P-1)}(i) \end{pmatrix} = W1(i) \begin{pmatrix} x^{(0)}(i) \\ \ldots \\ x^{(v-1)}(i) \end{pmatrix} + W2(i) \begin{pmatrix} x^{(0)}(i) \\ \ldots \\ x^{(v-1)}(i) \end{pmatrix},$$

where UE 820 may assume that physical downlink shared channel signals on antenna ports in the set [1000, . . . , 1000+v−1] for v layers would result in signals equivalent to corresponding symbols transmitted on antenna ports [3000, . . . , 3000+P−1]. In the formula, x is the signal before precoding, y is the signal after precoding, and i is the symbol index. W1 may involve codebook information for the first PMI, and W2 may involve codebook information for the second PMI. As a result, the CQI included in a multi-CSI report may be more accurate.

As indicated above, FIG. 8 is provided as an example. Other examples may differ from what is described with respect to FIG. 8.

FIG. 9 is a diagram illustrating an example 900 of priorities for CSI feedback, in accordance with various aspects of the present disclosure.

In some aspects, when a UE reports CSI with two PMIs on a physical uplink shared channel (PUSCH) or a physical uplink control channel (PUCCH), the UE may omit a portion of the CSI. The UE may determine what portion of the CSI to omit based at least in part on a priority order, such as the priority order shown in FIG. 9. For example, $N_{Rep}$ may be a quantity of CSI reports configured to be carried on the PUSCH. Priority 0 may be the highest priority and priority $4N_{Rep}+1$ may be the lowest priority. A CSI report n may correspond to a CSI report with the nth smallest CSI priority value among the $N_{Rep}$ CSI reports. When omitting CSI information for a particular priority level, the UE may omit all of the information at that priority level.

In some aspects, a CSI report may indicate, by a higher layer parameter csi-ReportingBand, subbands in increasing order with the lowest subband of csi-ReportingBand as subband 0. In some aspects, PMI2 may have the same priority as PMI1. In some aspects, PMI2 may have a lower priority than PMI1. In some aspects, PMI2 may not be supported on the PUCCH.

As indicated above, FIG. 9 is provided as an example. Other examples may differ from what is described with respect to FIG. 9.

Figure 10:
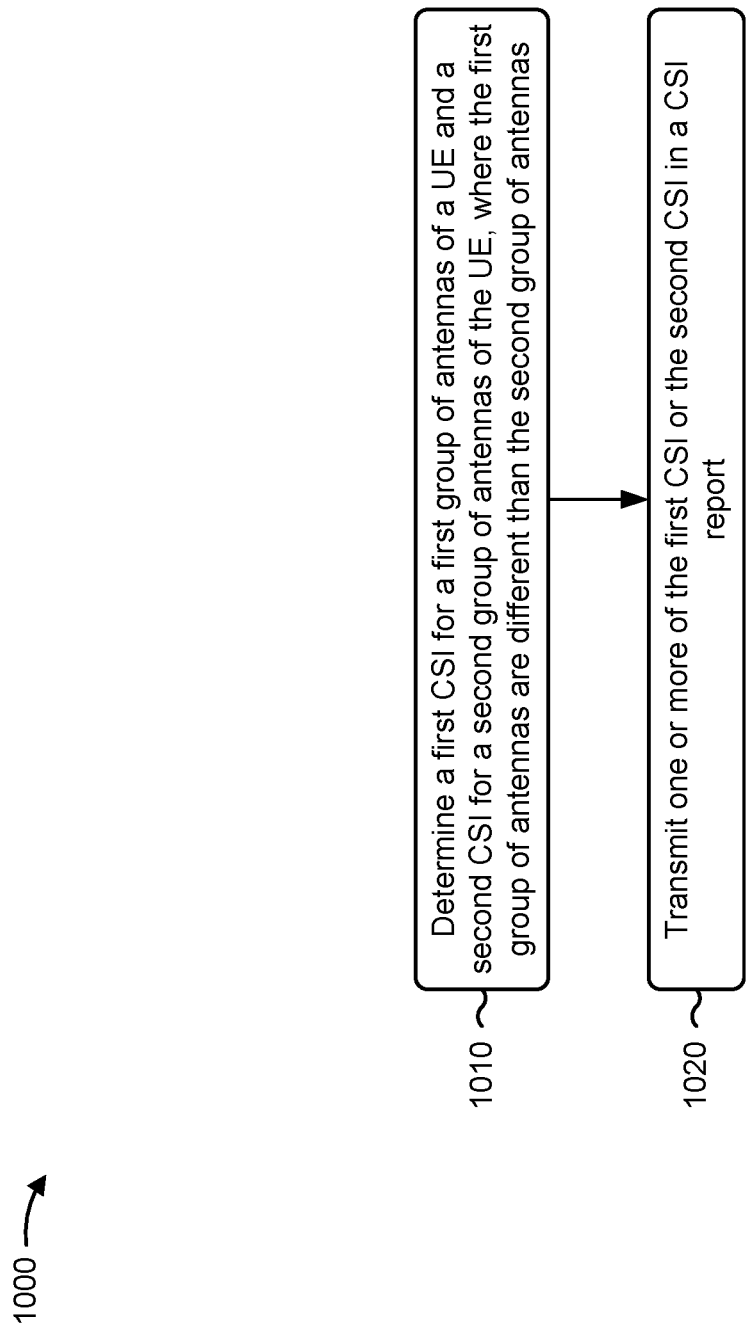
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where the UE (e.g., a UE 120 depicted in FIGS. 1 and 2, the UE depicted in FIG. 7, UE 820 depicted in FIG. 8, and/or the like) performs operations associated with CSI feedback for a UE with multiple antennas.

As shown in FIG. 10, in some aspects, process 1000 may include determining a first CSI for a first group of antennas of the UE and a second CSI for a second group of antennas of the UE (block 1010). For example, the UE (e.g., using receive processor 258, transmit processor 264, controller/processor 280, memory 282, and/or the like) may determine a first CSI for a first group of antennas of the UE and a second CSI for a second group of antennas of the UE, as described above. In some aspects, the first group of antennas are different than the second group of antennas.

As further shown in FIG. 10, in some aspects, process 1000 may include transmitting one or more of the first CSI or the second CSI in a CSI report (block 1020). For example, the UE (e.g., using receive processor 258, transmit processor 264, controller/processor 280, memory 282, and/or the like) may transmit one or more of the first CSI or the second CSI in a CSI report, as described above.

Process 1000 may include additional aspects, such as any single aspect or any combination of aspects described below and/or in connection with one or more other processes described elsewhere herein.

In a first aspect, transmitting the CSI report includes transmitting one of the first CSI or the second CSI in the CSI report based at least in part on a configuration for a common CSI report.

In a second aspect, alone or in combination with the first aspect, transmitting the CSI report includes transmitting the first CSI and the second CSI in the CSI report based at least in part on a configuration for a multi-CSI report.

In a third aspect, alone or in combination with one or more of the first and second aspects, determining the first CSI and the second CSI includes determining the first CSI and the second CSI based at least in part on a determination that a demodulation complexity of the UE satisfies a low complexity threshold.

In a fourth aspect, alone or in combination with one or more of the first through third aspects, process 1000 includes receiving a radio resource control message that indicates a CSI reporting configuration for multi-CSI reporting for the first group of antennas and the second group of antennas, and wherein transmitting the CSI report includes transmitting the CSI report based at least in part on the CSI reporting configuration.

In a fifth aspect, alone or in combination with one or more of the first through fourth aspects, the first CSI includes a first PMI and the second CSI includes a second PMI.

In a sixth aspect, alone or in combination with one or more of the first through fifth aspects, the CSI report includes one or more wideband information fields for the first PMI and one or more wideband information fields for the second PMI.

In a seventh aspect, alone or in combination with one or more of the first through sixth aspects, the CSI report includes one or more subband information fields for the first PMI and one or more subband information fields for the second PMI.

In an eighth aspect, alone or in combination with one or more of the first through seventh aspects, the CSI report includes at least two parts, and one of the at least two parts includes the second PMI.

In a ninth aspect, alone or in combination with one or more of the first through eighth aspects, process 1000 includes calculating a CQI based at least in part on the first PMI and the second PMI.

In a tenth aspect, alone or in combination with one or more of the first through ninth aspects, process 1000 includes omitting one or more of a first portion of the first CSI or a second portion of the second CSI from the CSI report based at least in part on one or more of a priority of the first portion or a priority of the second portion.

In an eleventh aspect, alone or in combination with one or more of the first through tenth aspects, the first portion and the second portion have a same priority level.

In a twelfth aspect, alone or in combination with one or more of the first through eleventh aspects, the first portion has a greater priority level than the second portion.

In a thirteenth aspect, alone or in combination with one or more of the first through twelfth aspects, transmitting the CSI report includes refraining from transmitting the second CSI on a physical uplink control channel.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
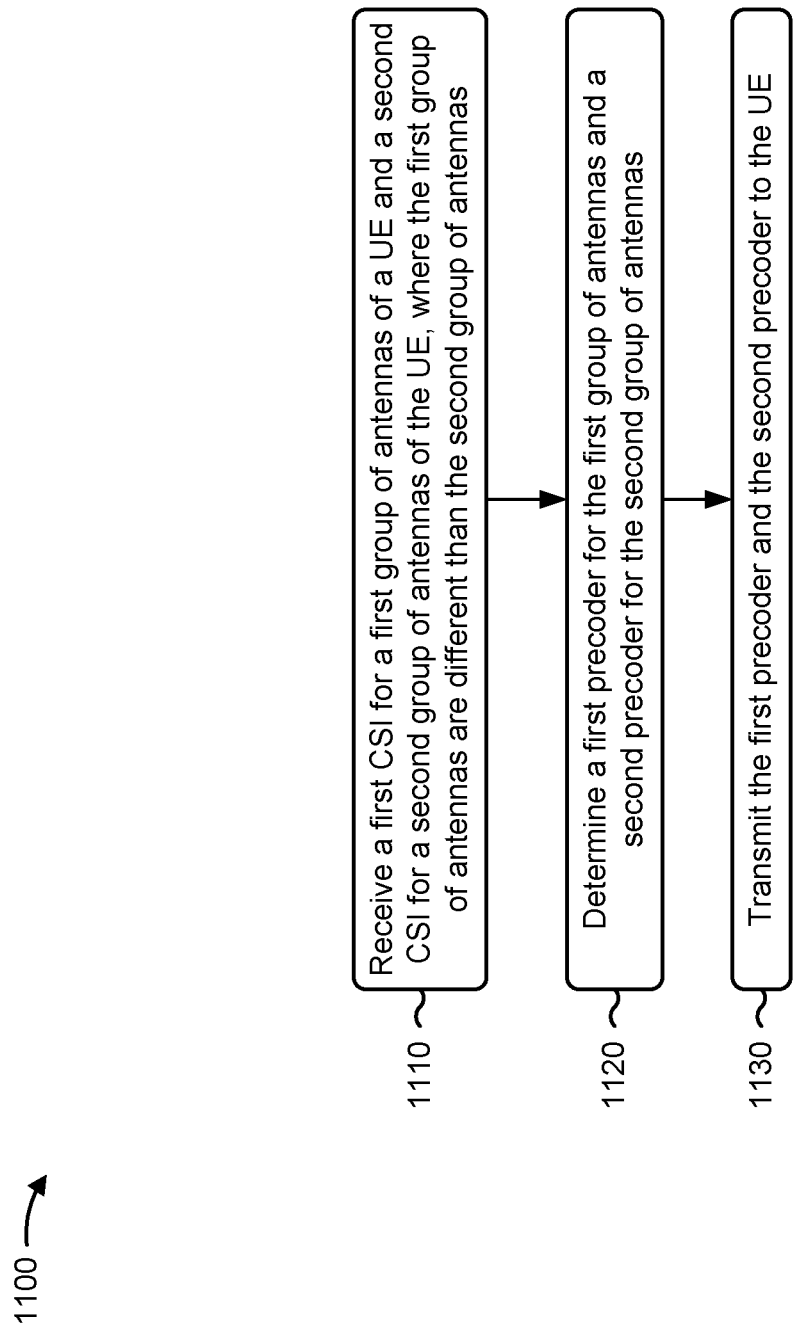
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where the base station (e.g., BS 110 depicted in FIGS. 1 and 2, the BS depicted in FIG. 7, BS

810 depicted in FIG. 8, and/or the like) performs operations associated with CSI feedback for a UE with multiple antennas.

As shown in FIG. 11, in some aspects, process 1100 may include receiving a first CSI for a first group of antennas of a UE and a second CSI for a second group of antennas of the UE (block 1110). For example, the base station (e.g., using transmit processor 220, receive processor 238, controller/processor 240, memory 242, and/or the like) may receive a first CSI for a first group of antennas of a UE and a second CSI for a second group of antennas of the UE, as described above. In some aspects, the first group of antennas are different than the second group of antennas.

As further shown in FIG. 11, in some aspects, process 1100 may include determining a first precoder for the first group of antennas and a second precoder for the second group of antennas (block 1120). For example, the base station (e.g., using transmit processor 220, receive processor 238, controller/processor 240, memory 242, and/or the like) may determine a first precoder for the first group of antennas and a second precoder for the second group of antennas, as described above.

As further shown in FIG. 11, in some aspects, process 1100 may include transmitting the first precoder and the second precoder to the UE (block 1130). For example, the base station (e.g., using transmit processor 220, receive processor 238, controller/processor 240, memory 242, and/or the like) may transmit the first precoder and the second precoder to the UE, as described above.

Process 1100 may include additional aspects, such as any single aspect or any combination of aspects described below and/or in connection with one or more other processes described elsewhere herein.

In a first aspect, process 1100 includes transmitting a configuration for a common CSI report.

In a second aspect, alone or in combination with the first aspect, process 1100 includes transmitting a configuration for a multi-CSI report.

In a third aspect, alone or in combination with one or more of the first and second aspects, process 1100 includes transmitting a radio resource control message that indicates a CSI reporting configuration for multi-CSI reporting for the first group of antennas and the second group of antennas.

In a fourth aspect, alone or in combination with one or more of the first through third aspects, the first CSI includes a first PMI and the second CSI includes a second PMI.

In a fifth aspect, alone or in combination with one or more of the first through fourth aspects, the CSI report includes one or more wideband information fields for the first PMI and one or more wideband information fields for the second PMI.

In a sixth aspect, alone or in combination with one or more of the first through fifth aspects, the CSI report includes one or more subband information fields for the first PMI and one or more subband information fields for the second PMI.

In a seventh aspect, alone or in combination with one or more of the first through sixth aspects, the CSI report includes at least two parts, and one of the at least two parts includes the second PMI.

In an eighth aspect, alone or in combination with one or more of the first through seventh aspects, the CSI report includes a channel quality indicator that is calculated based at least in part on the first PMI and the second PMI.

In a ninth aspect, alone or in combination with one or more of the first through eighth aspects, receiving the CSI report includes receiving the CSI report without one or more of a first portion of the first CSI or a second portion of the second CSI from the CSI report based at least in part on one or more of a priority of the first portion or a priority of the second portion.

In a tenth aspect, alone or in combination with one or more of the first through ninth aspects, the first portion and the second portion have a same priority level.

In an eleventh aspect, alone or in combination with one or more of the first through tenth aspects, the first portion has a greater priority level than the second portion.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
determining a first channel state information (CSI) for a first group of antennas of the UE and a second CSI for a second group of antennas of the UE, wherein the first group of antennas and the second group of antennas are grouped for CSI reporting based at least in part on a demodulation complexity of the UE satisfying a low complexity threshold, and the first group of antennas are different than the second group of antennas; and
transmitting one or more of the first CSI or the second CSI in a CSI report.

2. The method of claim 1, wherein transmitting the CSI report includes transmitting one of the first CSI or the second CSI in the CSI report based at least in part on a configuration for a common CSI report.

3. The method of claim 1, wherein transmitting the CSI report includes transmitting the first CSI and the second CSI in the CSI report based at least in part on a configuration for a multi-CSI report.

4. The method of claim 1, wherein the low complexity threshold is satisfied when a complexity of demodulation for antennas of the UE is below a complexity threshold.

5. The method of claim 1, further comprising receiving a radio resource control message that indicates a CSI reporting configuration for multi-CSI reporting for the first group of antennas and the second group of antennas, and wherein transmitting the CSI report includes transmitting the CSI report based at least in part on the CSI reporting configuration.

6. The method of claim 1, wherein the first CSI includes a first precoding matrix indicator (PMI) and the second CSI includes a second PMI.

7. The method of claim 6, wherein the CSI report includes one or more wideband information fields for the first PMI and one or more wideband information fields for the second PMI.

8. The method of claim 6, wherein the CSI report includes one or more subband information fields for the first PMI and one or more subband information fields for the second PMI.

9. The method of claim 6, wherein the CSI report includes at least two parts, and wherein one of the at least two parts includes the second PMI.

10. The method of claim 6, further comprising calculating a channel quality indicator based at least in part on the first PMI and the second PMI.

11. The method of claim 1, further comprising omitting one or more of a first portion of the first CSI or a second portion of the second CSI from the CSI report based at least in part on one or more of a priority of the first portion or a priority of the second portion.

12. The method of claim 11, wherein the first portion and the second portion have a same priority level.

13. The method of claim 11, wherein the first portion has a greater priority level than the second portion.

14. The method of claim 1, wherein transmitting the CSI report includes refraining from transmitting the second CSI on a physical uplink control channel.

15. A method of wireless communication performed by a base station, comprising:
receiving a first channel state information (CSI) for a first group of antennas of a user equipment (UE) and a second CSI for a second group of antennas of the UE, wherein the first group of antennas and the second group of antennas are grouped for CSI reporting based at least in part on a demodulation complexity of the UE satisfying a low complexity threshold, and the first group of antennas are different than the second group of antennas;
determining a first precoder for the first group of antennas and a second precoder for the second group of antennas; and
transmitting the first precoder and the second precoder to the UE.

16. The method of claim 15, further comprising transmitting a configuration for a common CSI report.

17. The method of claim 15, further comprising transmitting a configuration for a multi-CSI report.

18. The method of claim 15, further comprising transmitting a radio resource control message that indicates a CSI reporting configuration for multi-CSI reporting for the first group of antennas and the second group of antennas.

19. The method of claim 15, wherein the first CSI includes a first precoding matrix indicator (PMI) and the second CSI includes a second PMI.

20. The method of claim 19, wherein the CSI report includes one or more wideband information fields for the first PMI and one or more wideband information fields for the second PMI.

21. The method of claim 19, wherein the CSI report includes one or more subband information fields for the first PMI and one or more subband information fields for the second PMI.

22. The method of claim 19, wherein the CSI report includes at least two parts, and wherein one of the at least two parts includes the second PMI.

23. The method of claim 19, wherein the CSI report includes a channel quality indicator that is calculated based at least in part on the first PMI and the second PMI.

24. The method of claim 15, wherein receiving the CSI report includes receiving the CSI report without one or more of a first portion of the first CSI or a second portion of the second CSI from the CSI report based at least in part on one or more of a priority of the first portion or a priority of the second portion.

25. The method of claim 24, wherein the first portion and the second portion have a same priority level.

26. The method of claim 24, wherein the first portion has a greater priority level than the second portion.

27. A user equipment (UE) for wireless communication, comprising:
one or more memories; and
one or more processors coupled to the one or more memories, the one or more processors configured to:
determine a first channel state information (CSI) for a first group of antennas of the UE and a second CSI for a second group of antennas of the UE, wherein the first group of antennas and the second group of antennas are grouped for CSI reporting based at least in part on a demodulation complexity of the UE satisfying a low complexity threshold, and the first group of antennas are different than the second group of antennas; and transmit one or more of the first CSI or the second CSI in a CSI report.

28. A base station for wireless communication, comprising:

one or more memories; and one or more processors coupled to the one or more memories, the one or more processors configured to:

receive a first channel state information (CSI) for a first group of antennas of a user equipment (UE) and a second CSI for a second group of antennas of the UE, wherein the first group of antennas and the second group of antennas are grouped for CSI reporting based at least in part on a demodulation complexity of the UE satisfying a low complexity threshold, and the first group of antennas are different than the second group of antennas;

determine a first precoder for the first group of antennas and a second precoder for the second group of antennas; and transmit the first precoder and the second precoder to the UE.

29. An apparatus for wireless communication, comprising:

means for determining a first channel state information (CSI) for a first group of antennas of the apparatus and a second CSI for a second group of antennas of the apparatus, wherein the first group of antennas and the second group of antennas are grouped for CSI reporting based at least in part on a demodulation complexity of the apparatus satisfying a low complexity threshold, and the first group of antennas are different than the second group of antennas; and means for transmitting one or more of the first CSI or the second CSI in a CSI report.

* * * * *